(12) United States Patent
Mai et al.

(10) Patent No.: US 12,260,664 B2
(45) Date of Patent: Mar. 25, 2025

(54) METHOD FOR GENERATING REGIONS OF INTEREST BASED ON DATA EXTRACTED FROM NAVIGATIONAL CHARTS

(71) Applicant: United States of America as represented by the Secretary of the Navy, San Diego, CA (US)

(72) Inventors: Adrian Mai, San Diego, CA (US); Douglas Seth Lange, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 388 days.

(21) Appl. No.: 17/960,000

(22) Filed: Oct. 4, 2022

(65) Prior Publication Data

US 2024/0112489 A1  Apr. 4, 2024

(51) Int. Cl.
*G06V 30/422* (2022.01)
*G06V 30/146* (2022.01)
*G06V 30/18* (2022.01)
*G06V 30/19* (2022.01)

(52) U.S. Cl.
CPC .......... *G06V 30/422* (2022.01); *G06V 30/147* (2022.01); *G06V 30/1801* (2022.01); *G06V 30/18105* (2022.01); *G06V 30/19013* (2022.01); *G06V 30/19107* (2022.01)

(58) Field of Classification Search
CPC .............. G06V 30/422; G06V 30/147; G06V 30/1801; G06V 30/18105; G06V 30/19013; G06V 30/19107; G06V 10/25; G06V 10/763; G06V 30/416
USPC .......................................................... 382/113
See application file for complete search history.

(56) References Cited

U.S. PATENT DOCUMENTS

| | | | | |
|---|---|---|---|---|
| 4,984,279 | A * | 1/1991 | Kidney | G09B 29/005 382/113 |
| 6,421,675 | B1 * | 7/2002 | Ryan | G06F 16/30 |
| 7,894,984 | B2 * | 2/2011 | Rasmussen | G06T 17/05 340/995.14 |
| 8,577,525 | B2 * | 11/2013 | Wood | G09B 29/006 701/21 |
| 10,627,243 | B2 * | 4/2020 | Shaked | G06F 16/909 |
| 2009/0067750 | A1 * | 3/2009 | Pryszo | G06T 15/503 382/294 |

* cited by examiner

*Primary Examiner* — Negussie Worku
(74) *Attorney, Agent, or Firm* — Naval Information Warfare Center Pacific; Kyle Eppele; J. Eric Anderson

(57) ABSTRACT

A method for extracting data from a single-layer raster navigational chart (RNC) comprising: using a computer vision algorithm to extract color, text and symbol data from the RNC, storing the color, text, and symbol data in a database, and building an RNC data vector based solely on the color, text, and symbol data of the RNC, wherein the RNC data vector identifies geographical features shown in the RNC and a location of the geographical features' corresponding pixels in the RNC; and drawing a region of interest on the navigational chart based on user input and the RNC data vector, wherein a perimeter of the region of interest is georeferenced with latitude and longitude information.

20 Claims, 3 Drawing Sheets

Fig. 3A     Fig. 3B

METHOD FOR GENERATING REGIONS OF INTEREST BASED ON DATA EXTRACTED FROM NAVIGATIONAL CHARTS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 210854.

BACKGROUND OF THE INVENTION

A raster navigational chart (RNC) is a copy of a navigational paper chart in image form. An RNC contains important information such as navigational channels, water depths, rocky areas etc. However, a RNC is hard to interpret by computers and even humans as it contains very dense information. There is a need for an improved way to extract information from navigational charts.

SUMMARY

Disclosed herein is a method for extracting data from a navigational chart comprising the following steps. One step provides for determining if the navigational chart is a single-layer RNC or an electronic navigational chart (ENC). If the navigational chart is a single-layer RNC, the method provides for using a computer vision algorithm to extract color, text and symbol data from the single-layer RNC; storing the color, text, and symbol data in a database; and building an RNC data vector based solely on the color, text, and symbol data of the single-layer RNC. The RNC data vector identifies geographical features shown in the single-layer RNC and a location of the geographical features' corresponding pixels in the single-layer RNC. If the navigational chart is an ENC, the method provides for identifying an ENC data vector. The ENC data vector identifies geographical features shown in the ENC and a location of the geographical features' corresponding pixels in the ENC. Another step provides for drawing a region of interest on the navigational chart based on user input and the ENC or RNC data vector. A perimeter of the region of interest is georeferenced with latitude and longitude information.

BRIEF DESCRIPTION OF THE DRAWINGS

Throughout the several views, like elements are referenced using like references. The elements in the figures are not drawn to scale and some dimensions are exaggerated for clarity.

FIG. 3A is an illustration of a set of data points.

FIG. 3B is an illustration of a set of data points with a convex hull drawn around them.

DETAILED DESCRIPTION OF EMBODIMENTS

The disclosed method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
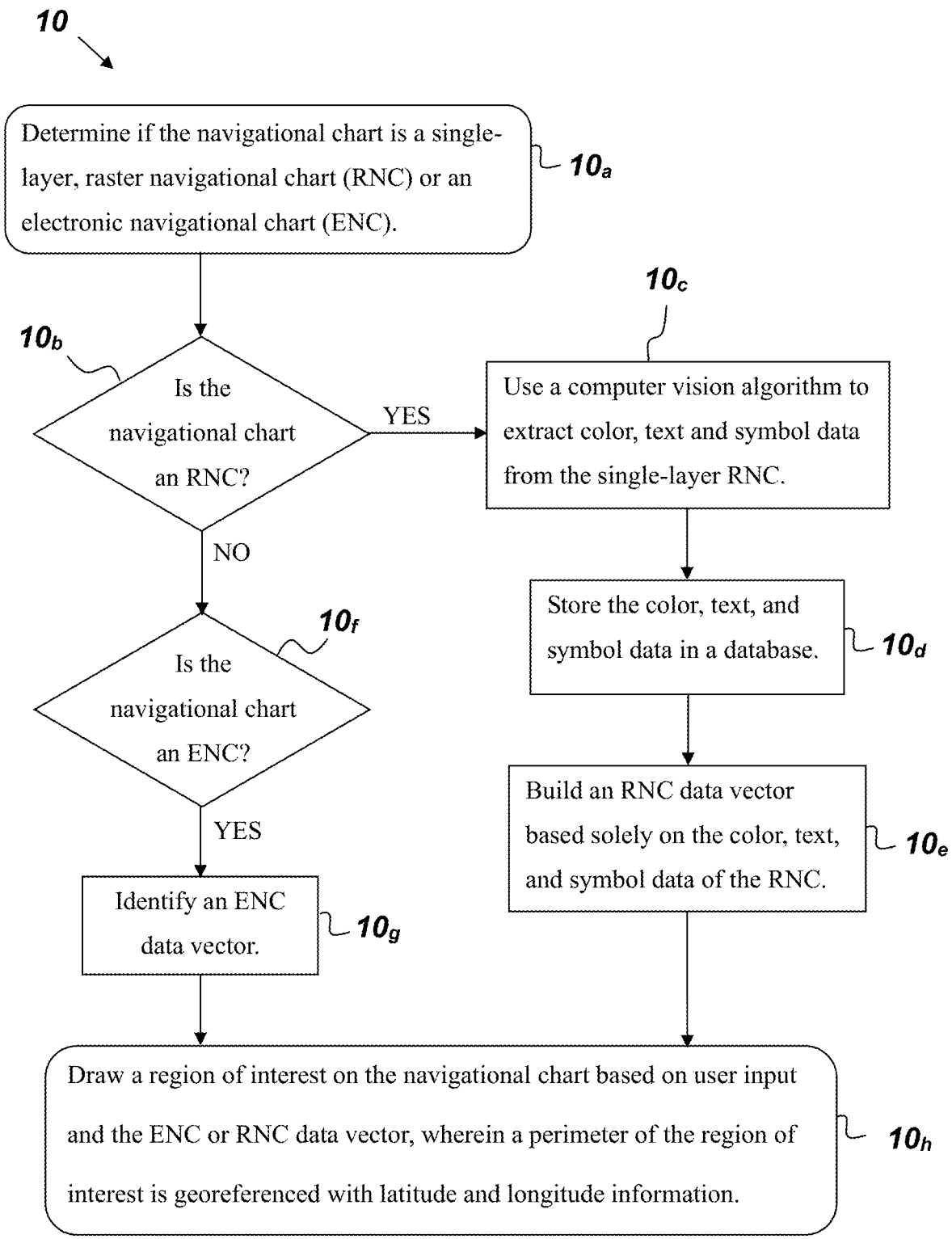
FIG. 1 is a flowchart of a method for extracting data from a navigational chart.

FIG. 1 is a flowchart of a method 10 for extracting data from a navigational chart comprising, consisting of, or consisting essentially of the following steps. One step $10_a$ provides for determining if the navigational chart is a single-layer RNC or an ENC. If the navigational chart is a single-layer RNC (see decision $10_b$), another step $10_c$ provides for using a computer vision algorithm to extract color, text and symbol data from the single-layer RNC. Another step $10_d$ provides for storing the color, text, and symbol data in a database. Another step $10_e$ provides for building an RNC data vector based solely on the color, text, and symbol data of the single-layer RNC. The RNC data vector identifies geographical features shown in the single-layer RNC and a location of the geographical features' corresponding pixels in the single-layer RNC. For example, the RNC data vector may be a data base that stores information extracted from the RNC in different columns such as in a spreadsheet. If the navigational chart is an ENC (see decision $10_f$), another step $10_g$ provides for identifying an ENC data vector. The ENC data vector identifies geographical features shown in the ENC and a location of the geographical features' corresponding pixels in the ENC. Another step $10_h$ provides for drawing a region of interest on the navigational chart based on user input and the ENC or RNC data vector. Points along a perimeter of the region of interest are georeferenced with latitude and longitude information.

Method 10 can be thought of, in part, as a reverse-engineering approach of using computer vision to extract features (e.g., text and symbolic features) from a single-layer RNC image. An RNC is a digital version of the raw raster paper chart, which contains information such as water depths, rocky areas etc. of a certain geographical area. Method 10 enables RNCs to become machine readable, and the features extracted can be used to draw regions of interest. Method 10 is able to create regions of interest without multiple layers of information such as databases containing associations of pixels with location/depth information, bathymetric information, or GPS information. Even though a single-layer RNC image is information-dense, the information is uniform and rigid. For instance, there are fixed number of colors on the RNC to represent different features. For example, water depth and contour may be colored black while shallow water regions may be colored light blue. Image inpainting may be used to facilitate the color extraction process. For example, the step of building an RNC data vector may comprise using color extraction and inpainting to identify land and shallow areas on the RNC. Inpainting may be used to erase all artifacts in the RNC except for color. More specifically, inpainting may be used to remove all the drawing symbols and text from the RNC-resulting in an RNC image that only shows colored regions. Then the different regions may be identified based on their color only and such data, along with the pixels associated with the various colors, are extracted and added to the RNC data vector. Certain symbols such as symbols representing rocky area areas may also be present in an RNC. Method 10 may be used to build a database of knowledge about a geographical region depicted by the RNC based solely on the single-layer RNC. Features available in an ENC can be used to create a database as well. One or both of those databases (i.e., the database created from ENC features and the database created from RNC features) combined with user inputs can enable one to create a top, transparent layer to the navigation chart that shows customized regions of interest. Suitable examples of both RNCs and ENCs may be downloaded from the National Oceanic and Atmospheric Administration (NOAA) website.

Figure 2A:
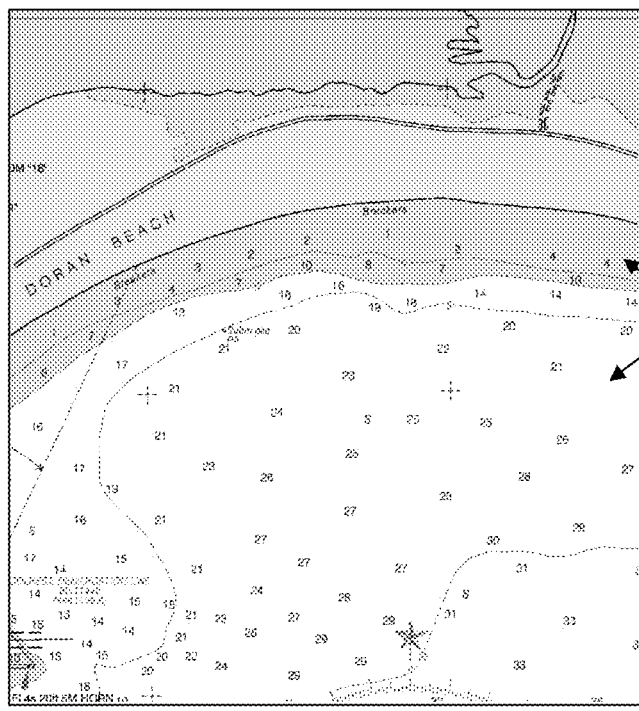
FIGS. 2A and 2B are partial views of an RNC image.
Figure 2B:
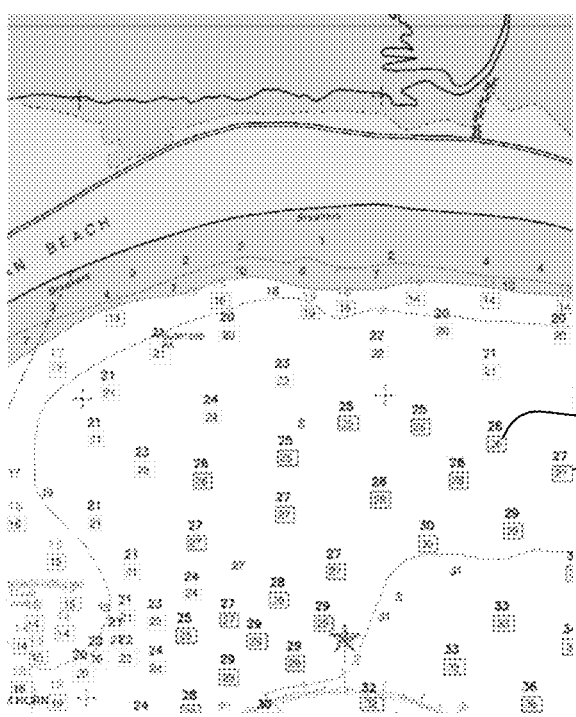

FIGS. 2A and 2B are partial views of an example of a simple raw RNC image 12 (Red Green Blue image). The following description is a specific example of how method 10 may be used to create regions of interest on the RNC image 12. In this embodiment, method 10 receives the RNC image 12 in a .kap file format. A computer then converts the RNC image 12 into a tag image file format (TIFF or .tiff). Water depth information is embedded in the RNC image 12 as numerals positioned throughout depicted water areas 14 (e.g., sea, river etc.). The water depth information is a text number written in the RNC image 12 with units in meters. Method 10 leverages the format of information visually depicted in the RNC image 12 and optical character recognition (OCR) to detect and recognize text. Those pixels in the RNC image 12 that depict text, or symbols (e.g., indicating rocky areas, currents, etc.) are first recognized by the computer and then an OCR algorithm is used to recognize the text. Any algorithm capable of detecting text based on its visual appearance may be used. A suitable example of a text detection algorithm that may be used in method 10 is the efficient accurate scene text (EAST) detector. Any algorithm capable of interpreting detected text may be used by method 10. One suitable example of a text recognition algorithm is the tesseract OCR engine. In this example, the EAST detector extracts a rectangular bounding box 16, as shown in FIG. 2B, in each location on the RNC image 12 where the depth numbers appear. In other steps, text besides numbers may be extracted as well. Next, each bounding box 16 may be cropped out of the RNC image 12 and fed into the OCR engine to read out the actual text. The depth information and its associated location on the RNC may then be stored in a database.

Figure 3C:
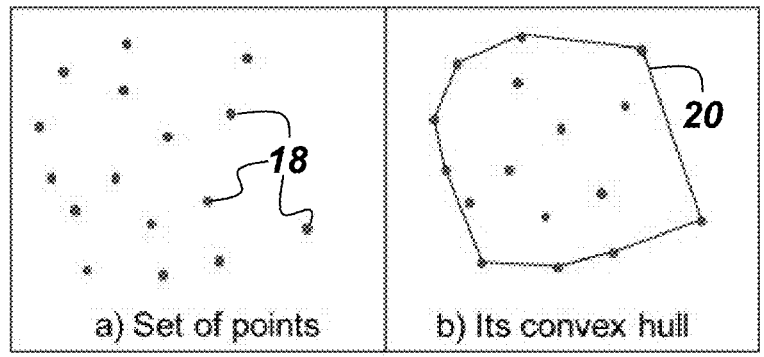
FIG. 3C is an illustration of an RNC on which several regions of interest have been drawn based on extracted data from the RNC and user input.
Figure 3C:
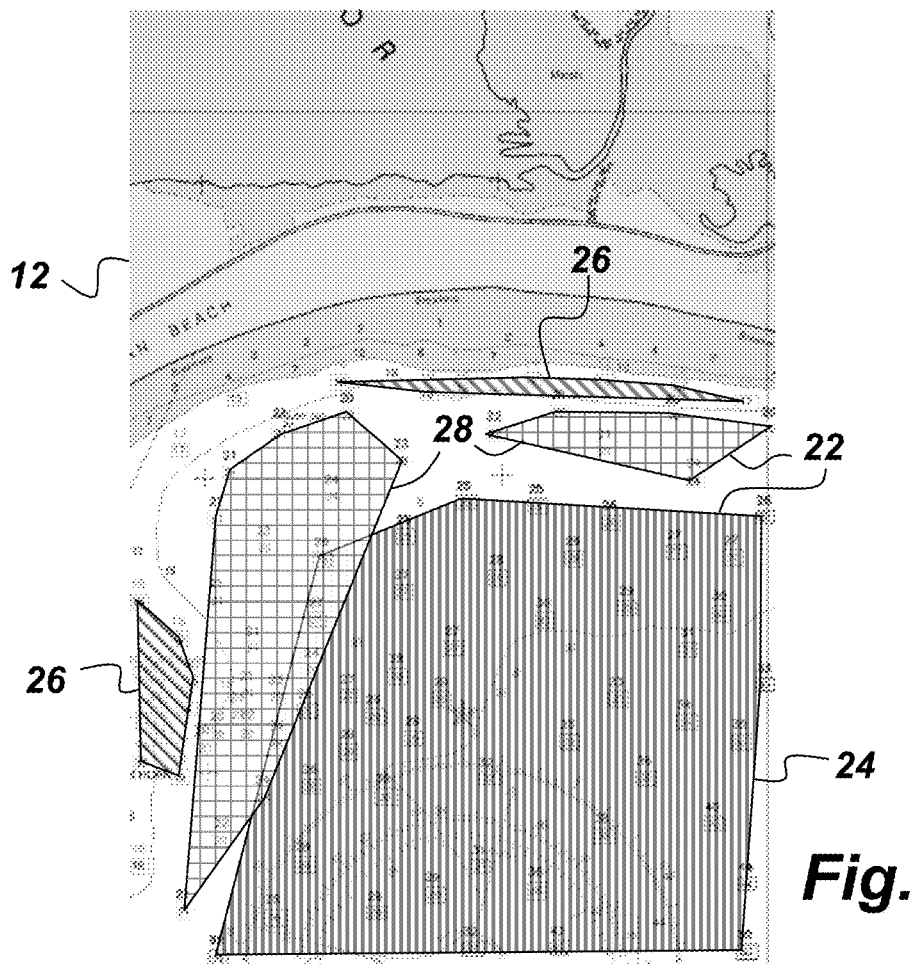

Beside detailed text, each RNC may also contain many useful symbols depicting other features such as rocky areas, buoys, etc. In this embodiment, method 10 uses an image-processing technique called template matching to create rectangles around symbols on the RNC image 12. Method 10 then compares each rectangle-bounded symbol with a database of symbols to look for matches. If a match is found for a given rectangle-bounded symbol, the properties associated with the matching template are then associated with the pixels that include the given rectangle-bounded symbol. The information regarding the text and the symbols and their associated pixels may then be used to create a data vector for the RNC image 12. Next, method 10 uses the data vector extracted from the RNC image 12 to create one or more regions of interest 22 (such as shown in FIG. 3C). If a data vector from an ENC is already available, it may be tailored to be in the format of pixel-based locations and then may also be used to create regions of interest 22.

FIG. 3A is an illustration of a set of data points 18. With the water depths extracted from the text detection and recognition engines, one can create regions of interest on the RNC. The regions of interest may be based on any desired features, depth profiles being just one example. To illustrate, assume that the data points 18 shown in FIG. 3A represent depth indicators on an RNC that all fall within a desired depth range. All the data points on the RNC that represent depth profiles within the desired range may be clustered together and a convex hull shape 20 may be drawn around them, such as is depicted in FIG. 3B. Any one or more features may be clustered together to form the basis of the region of interest. The region of interest may also be characterized by an absence of, or distance from, certain features. Each feature shown on the RNC has its own latitude and longitude location (corresponding to certain pixels on the RNC) that may be used to perform clustering. In one embodiment, it may be desirable for the clustered features to be within the desired depth range and to be within a certain distance from each other in order to be binned in the same region. For example, one may define a customizable radius from a centroid of the cluster to its outermost data point. Each data point 18 may represent a center point of each bounding box 16. In another example, the region of interest may be drawn so as to exclude a given geographical area. The region of interest may be drawn so as to highlight a safe navigation area around given geographical features' corresponding pixels on the navigational chart.

FIG. 3C is an illustration of an RNC 12 with multiple regions of interest 22 overlaid thereon. In FIG. 3C, each convex hull region of interest 22 covers a pre-defined depth range. Each vertex of each region of interest 22 will have georeferencing information (i.e., latitude and longitude coordinates corresponding to certain pixels on the RNC) associated therewith. The regions of interest 22 may by any desired size or shape. For example, the region of interest may span land areas and water areas. Any algorithm or program capable of drawing the region of interest may be used in method 10. By way of example, instead of using convex hull techniques to define the regions of interest, a region of interest may be drawn as a rectangle with sides that align with shorelines. Any algorithm for grouping or clustering data points may be used to build the region of interest. Suitable examples of clustering algorithms include, but are not limited to, k-means clustering and expectation maximization. Method 10 may also be used to draw regions of interest on other types of charts as well (e.g., bathymetry charts). In one embodiment, the step of defining the region of interest comprises identifying a set of undesired geographical features and then ensuring that an avoidance area around each of the undesired geographical features' corresponding pixels is not highlighted (i.e., not included in the region of interest) on the navigational chart. Alternatively, the region of interest could be drawn to depict areas to avoid (e.g., no-go zones). In FIG. 3C, a red-highlighted region of interest 24 corresponds to a first depth range, a green-highlighted region of interest 26 corresponds to a second depth range, and a yellow-highlighted region of interest 28 corresponds to a third depth range. Regions of interest may be allowed to overlap, such as is shown in FIG. 3C where region of interest 28 overlaps with region of interest 24. In such instances (i.e., where regions overlap) notes may be added to identify the overlapping areas. Users may be given access to, and additional information about, the overlapping regions.

From the above description of method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A method for extracting data from a navigational chart comprising the following steps:
   determining if the navigational chart is a single-layer, raster navigational chart (RNC) or an electronic navigational chart (ENC);
   if the navigational chart is a single-layer RNC,
      using a computer vision algorithm to extract color, text and symbol data from the single-layer RNC,
      storing the color, text, and symbol data in a database, and
      building an RNC data vector based solely on the color, text, and symbol data of the single-layer RNC, wherein the RNC data vector identifies geographical features shown in the single-layer RNC and a location of the geographical features' corresponding pixels in the single-layer RNC;
   if the navigational chart is an ENC,
      identifying an ENC data vector, wherein the ENC data vector identifies geographical features shown in the ENC and a location of the geographical features' corresponding pixels in the ENC; and
   drawing a region of interest on the navigational chart based on user input and the ENC or RNC data vector, wherein a perimeter of the region of interest is georeferenced with latitude and longitude information.

2. The method for extracting data from a navigational chart of claim 1, wherein the region of interest comprises an area having a predefined depth range.

3. The method for extracting data from a navigational chart of claim 2, wherein the region of interest excludes a given geographical area.

4. The method for extracting data from a navigational chart of claim 3, wherein the RNC further comprises georeferenced data such that a computer is able to associate a given RNC with a given geographic location.

5. The method for extracting data from a navigational chart of claim 1, wherein the region of interest excludes a given geographical area.

6. The method for extracting data from a navigational chart of claim 1, wherein the step of drawing the region of interest further comprises identifying a set of desired geographical features and then highlighting a safe navigation area around the desired geographical features' corresponding pixels on the navigational chart.

7. The method for extracting data from a navigational chart of claim 6, wherein the step of drawing the region of interest further comprises identifying a set of undesired geographical features and then ensuring that an avoidance area around each of the undesired geographical features' corresponding pixels is not highlighted on the navigational chart.

8. The method for extracting data from a navigational chart of claim 6, wherein a distance from a centroid of a cluster of desired geographical feature is defined by a user.

9. The method for extracting data from a navigational chart of claim 6, wherein the step of identifying a set of desired geographical features is accomplished with a computer using location-based k-means clustering.

10. The method for extracting data from a navigational chart of claim 9, wherein the set of desired geographical features consists of depth profiles.

11. The method for extracting data from a navigational chart of claim 1, wherein the step of building an RNC data vector further comprises using optical character recognition to extract depth geographical features from the RNC.

12. The method for extracting data from a navigational chart of claim 11, wherein the step of building an RNC data vector further comprises using color extraction and inpainting to identify land and shallow areas.

13. The method for extracting data from a navigational chart of claim 1, wherein the region of interest is defined by a polygon wherein each vertex of the polygon is associated with latitude and longitude coordinates.

14. The method for extracting data from a navigational chart of claim 13, wherein the polygon is a convex hull polygon.

15. The method for extracting data from a navigational chart of claim 1, wherein the step of building an RNC data vector further comprises comparing symbols in the RNC to a database of symbol templates to identify matching symbols.

16. The method for extracting data from a navigational chart of claim 1 wherein the RNC is a tag image file format (TIFF) image.

17. A method for extracting data from a single-layer, raster navigational chart (RNC) comprising:
   using a computer vision algorithm to extract color, text and symbol data from the single-layer RNC;
   storing the color, text, and symbol data in a database;
   building an RNC data vector based solely on the color, text, and symbol data of the single-layer RNC, wherein the RNC data vector identifies geographical features shown in the single-layer RNC and a location of the geographical features' corresponding pixels in the single-layer RNC; and
   drawing a region of interest on the navigational chart based on user input and the RNC data vector, wherein a perimeter of the region of interest is georeferenced with latitude and longitude information.

18. The method for extracting data from an RNC of claim 17, wherein the step of drawing the region of interest further comprises identifying a set of undesired geographical features and then ensuring that an avoidance area around each of the undesired geographical features' corresponding pixels is not part of the region of interest.

19. The method for extracting data from an RNC of claim 18, wherein the step of building an RNC data vector further comprises:
   using optical character recognition to extract depth geographical features from the RNC;
   using color extraction and inpainting to identify land and shallow areas; and
   comparing symbols in the RNC to a database of symbol templates to identify matching symbols.

20. The method for extracting data from an RNC of claim 19, wherein the RNC is a tag image file format (TIFF) image.

* * * * *